US009699825B2

(12) United States Patent
Lee et al.

(10) Patent No.: US 9,699,825 B2
(45) Date of Patent: Jul. 4, 2017

(54) METHOD AND APPARATUS FOR TRANSMITTING INDICATION IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 14/651,095

(22) PCT Filed: Jan. 16, 2014

(86) PCT No.: PCT/KR2014/000471
§ 371 (c)(1),
(2) Date: Jun. 10, 2015

(87) PCT Pub. No.: WO2014/112803
PCT Pub. Date: Jul. 24, 2014

(65) Prior Publication Data
US 2015/0319801 A1 Nov. 5, 2015

Related U.S. Application Data

(60) Provisional application No. 61/753,381, filed on Jan. 16, 2013, provisional application No. 61/753,859, filed on Jan. 17, 2013.

(51) Int. Cl.
*H04W 4/00* (2009.01)
*H04W 76/04* (2009.01)
(Continued)

(52) U.S. Cl.
CPC .......... *H04W 76/046* (2013.01); *H04L 5/001* (2013.01); *H04W 56/00* (2013.01);
(Continued)

(58) Field of Classification Search
CPC .......... H04W 76/046; H04W 56/0015; H04W 74/0833; H04W 56/00; H04W 36/0055; H04L 5/001
See application file for complete search history.

(56) References Cited

U.S. PATENT DOCUMENTS

2012/0106510 A1* 5/2012 Kuo .................... H04W 76/064
370/331
2012/0196603 A1 8/2012 Mochizuki et al.
(Continued)

FOREIGN PATENT DOCUMENTS

EP 2249601 A2 11/2010
EP 2384052 A1 11/2011
(Continued)

*Primary Examiner* — Afshawn Towfighi
(74) *Attorney, Agent, or Firm* — Dentons US LLP

(57) ABSTRACT

A method and apparatus for transmitting an indication in a wireless communication system is provided. A user equipment (UE) receives information on a configuration of a second cell from a first cell, performs a synchronization procedure with the second cell, and after the synchronization procedure is successfully performed, transmitting an indication, which indicates that the second cell is successfully configured, to the first cell. Accordingly, a radio resource control (RRC) connection reconfiguration complete message is transmitted after the synchronization procedure.

14 Claims, 17 Drawing Sheets

(51) Int. Cl.
*H04W 56/00* (2009.01)
*H04W 74/08* (2009.01)
*H04L 5/00* (2006.01)
*H04W 36/00* (2009.01)

(52) U.S. Cl.
CPC ... *H04W 56/0015* (2013.01); *H04W 74/0833* (2013.01); *H04W 36/0055* (2013.01)

(56) References Cited

U.S. PATENT DOCUMENTS

| | | |
|---|---|---|
| 2012/0281548 A1 | 11/2012 | Lin et al. |
| 2014/0192740 A1* | 7/2014 | Ekpenyong ........... H04L 5/0035 370/329 |
| 2015/0195800 A1* | 7/2015 | Zhu ...................... H04W 72/12 370/311 |

FOREIGN PATENT DOCUMENTS

| | | |
|---|---|---|
| WO | 2012/137074 A1 | 10/2012 |
| WO | 2012/138125 A2 | 10/2012 |

* cited by examiner

METHOD AND APPARATUS FOR TRANSMITTING INDICATION IN WIRELESS COMMUNICATION SYSTEM

This application is a 35 USC §371 National Stage entry of International Application No. PCT/KR2014/000471 filed on Jan. 16, 2014 and claims priority to U.S. Provisional Application No. 61/753,381, filed Jan. 16, 2013, and U.S. Provisional Application No. 61/753,859, filed Jan. 17, 2013 all of which are incorporated by reference in their entirety herein.

BACKGROUND OF THE INVENTION

Field of the Invention

The present invention relates to wireless communications, and more specifically, to a method and apparatus for transmitting an indication in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Carrier aggregation (CA) may be introduced. In CA, two or more component carriers (CCs) are aggregated in order to support wider transmission bandwidths up to 100 MHz. A UE may simultaneously receive or transmit on one or multiple CCs depending on its capabilities. A Rel-10 UE with reception and/or transmission capabilities for CA can simultaneously receive and/or transmit on multiple CCs corresponding to multiple serving cells. A Rel-8/9 UE can receive on a single CC and transmit on a single CC corresponding to one serving cell only.

When CA is configured, a user equipment (UE) only has one radio resource control (RRC) connection with the network. At RRC connection establishment/re-establishment/handover, one serving cell provides the non-access stratum (NAS) mobility information (e.g., tracking area identity (TAI)), and at RRC connection re-establishment/handover, one serving cell provides the security input. This cell is referred to as the primary cell (PCell). In the downlink, the carrier corresponding to the PCell is the downlink primary component carrier (DL PCC) while in the uplink it is the uplink primary component carrier (UL PCC).

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

For one feature of small cell enhancements, dual connectivity may be introduced. Dual connectivity is an operation where a given user equipment (UE) consumes radio resources provided by at least two different network points (master eNB (MeNB) and secondary eNBs (SeNBs)) connected with non-ideal backhaul while in an radio resource control (RRC) connected state (RRC_CONNECTED). Furthermore, each eNB involved in dual connectivity for a UE may assume different roles. Those roles do not necessarily depend on the eNB's power class and may vary among UEs.

When a UE has dual connectivity with a macro cell and small cells, a method for configuring a SCell efficiently may be required.

SUMMARY OF THE INVENTION

The present invention provides a method and apparatus for transmitting an indication in a wireless communication system. The present invention provides a method for transmitting an indication which indicates that a specific cell is successfully configured, after synchronization with the specific cell is performed successfully. The present invention provides a method for reconfiguring radio resource control (RRC) connection for small cell change.

In an aspect, a method for transmitting, by a user equipment (UE), an indication in a wireless communication system is provided. The method includes receiving information on a configuration of a second cell from a first cell, performing a synchronization procedure with the second cell, and after the synchronization procedure is successfully performed, transmitting an indication, which indicates that the second cell is successfully configured, to the first cell.

The first cell and the second cell may be controlled by different eNodeBs (eNBs) respectively.

The first cell may be a primary serving cell (PCell) of a master eNB (MeNB), and the second cell may be a secondary serving cell (SCell) of a secondary eNB (SeNB).

The UE may support dual connectivity with the MeNB and the SeNB.

The first cell may be a macro cell controlled by a MeNB, and the second cell may be a small cell controlled by a SeNB.

The synchronization procedure may include a random access procedure.

The successful configuration of the second cell may include an addition of the second cell.

The information on the configuration may be received via a radio resource control (RRC) connection reconfiguration message.

The indication may be transmitted via an RRC connection reconfiguration complete message.

In another aspect, a method for transmitting, by a user equipment (UE), an indication in a wireless communication system is provided. The method includes receiving information on a configuration of a second cell from a first cell, performing a synchronization procedure with the second cell, and if the synchronization procedure is not successfully performed, transmitting an indication, which indicates that the configuration of the second cell is failed, to the first cell.

The indication may be transmitted via an RRC connection re-establishment request message.

Successful synchronization with a cell can be confirmed by a subsequent indication.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
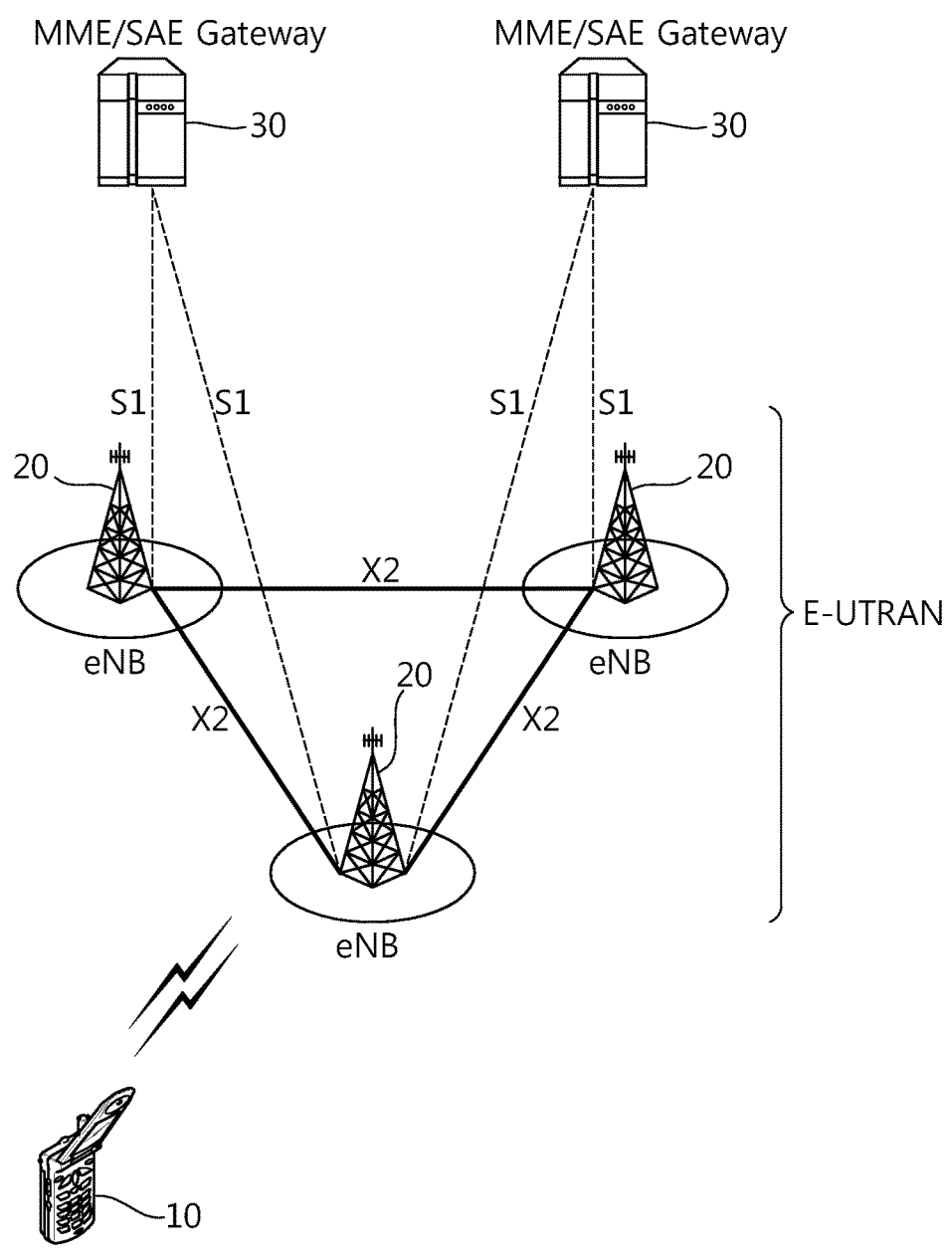
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
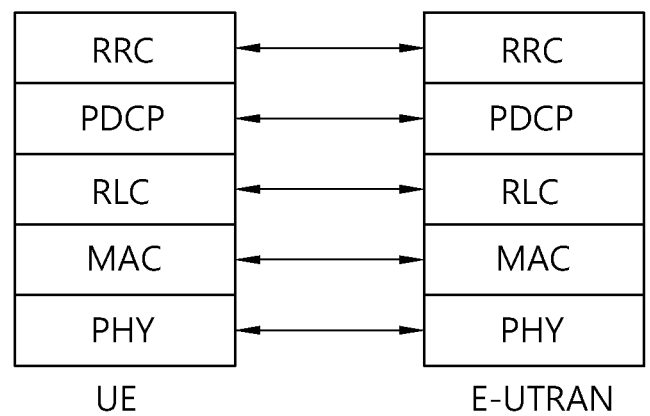
FIG. 2 shows a control plane of a radio interface protocol of an LTE system.
Figure 3:
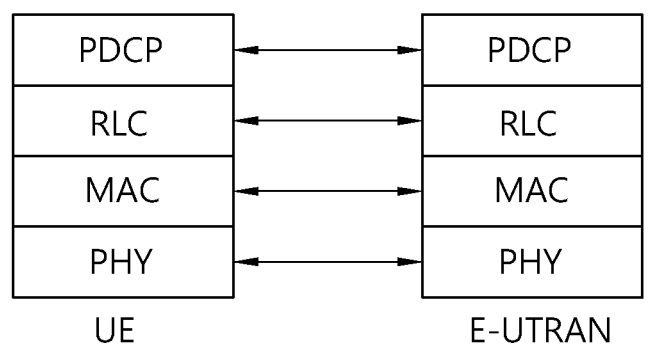
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
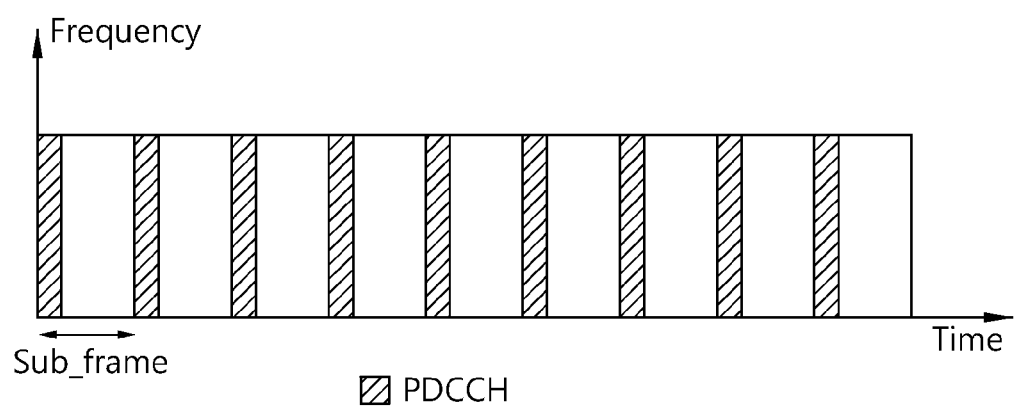
FIG. 4 shows an example of a physical channel structure.

FIG. 4 shows an example of a physical channel structure. A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

$$\text{Transmit power} = \text{TransmitPilot} - \text{RxPilot} + \text{ULInterference} + \text{Offset} + \text{SNRRequired}$$

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

Small cell enhancement is described. It may be referred to 3GPP TR 36.932 V12.0.0 (2012-12).

Figure 5:
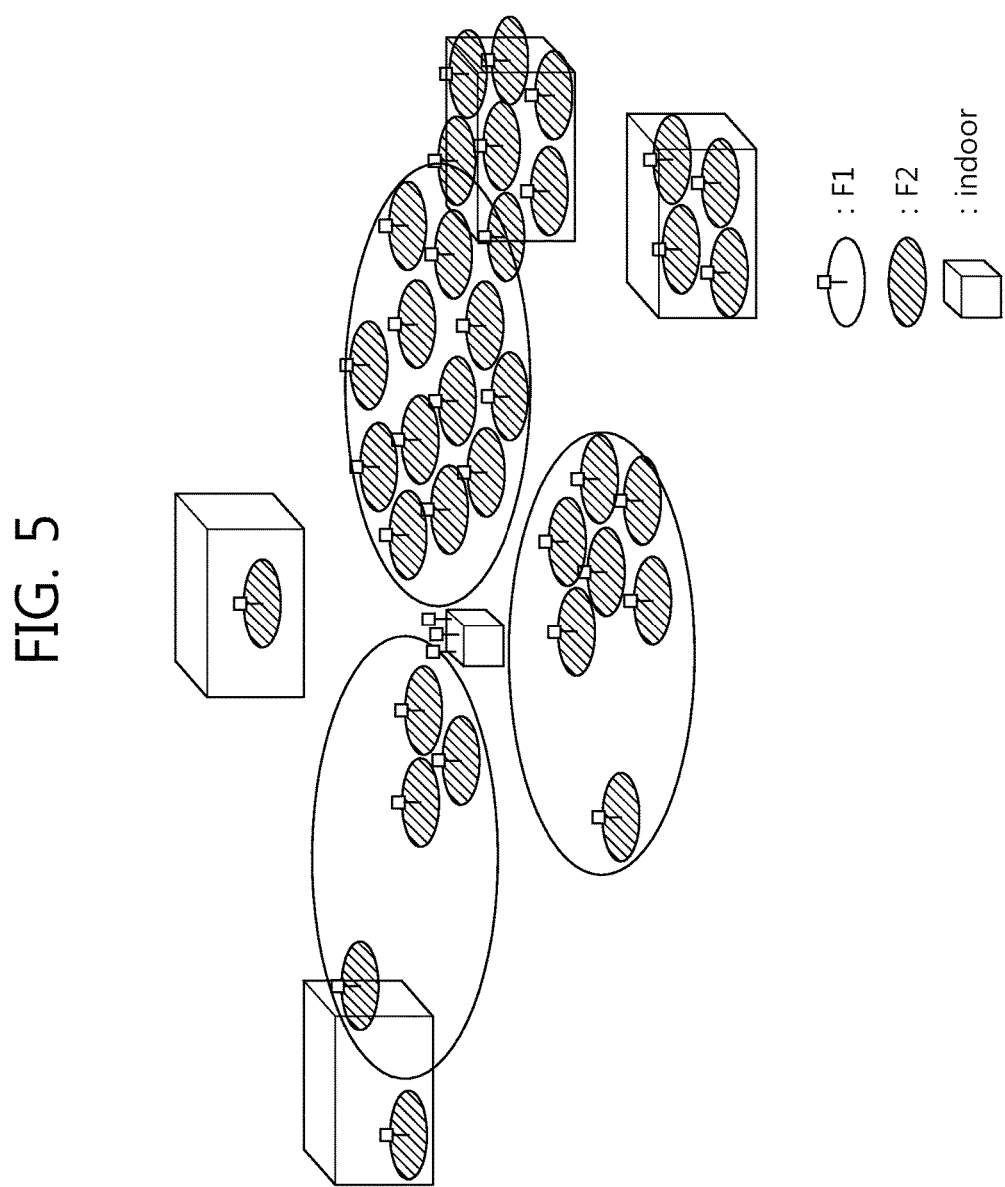
FIG. 5 shows deployment scenarios of small cells with/without macro coverage.

FIG. 5 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 5, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:
  where the UE is in coverage of both the macro cell and the small cell simultaneously
  where the UE is not in coverage of both the macro cell and the small cell simultaneously.

Also, the deployment scenario where small cell nodes are not deployed under the coverage of one or more overlaid E-UTRAN macro-cell layer(s) may be considered.

Dual connectivity is described. When the UE is in coverage of both a macro cell and small cell, the UE would be typically connected to both the macro cell and one or more small cells simultaneously.

Figure 6:
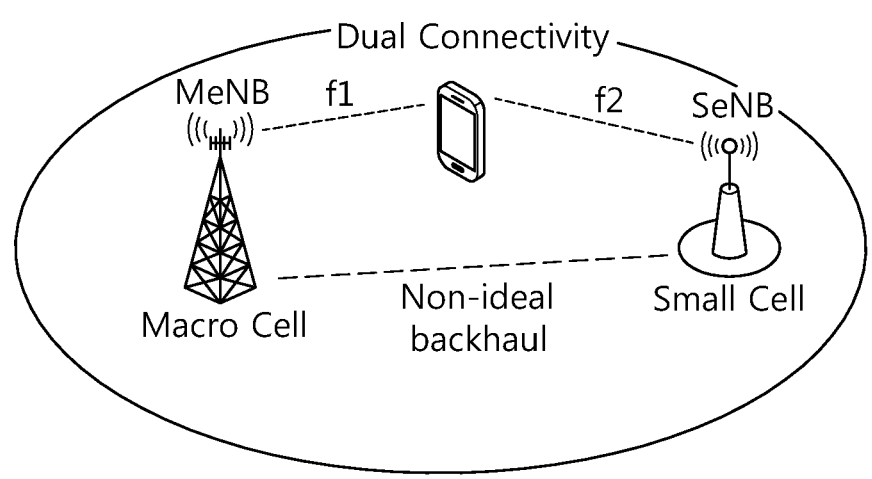
FIG. 6 shows an example of dual connectivity to a macro cell and small cell.

FIG. 6 shows an example of dual connectivity to a macro cell and small cell.

Referring to FIG. 6, an MeNB stands for a master eNB (or, a macro cell eNB), and an SeNB stands for a secondary eNB (or, a small cell eNB). The UE has a connection with the MeNB in frequency f1. In dual connectivity, the MeNB controls the macro cell, and is the eNB which terminates at least S1-MME and therefore act as mobility anchor towards the CN. Also, the UE has a connection with the SeNB in frequency f2. In dual connectivity, the SeNB controls one or more small cells, and is the eNB providing additional radio resources for the UE, which is not the MeNB. Accordingly, the UE may receive control signaling from the MeNB, and may receive data from the SeNB. The interface between the MeNB and SeNB is called an Xn interface. The Xn interface is assumed to be non-ideal backhaul. For example, delay in the Xn interface may be up to 60 ms.

Four architecture models may be considered in E-UTRAN for small cell enhancement.

1) Intra-eNB CA Model

Figure 7:
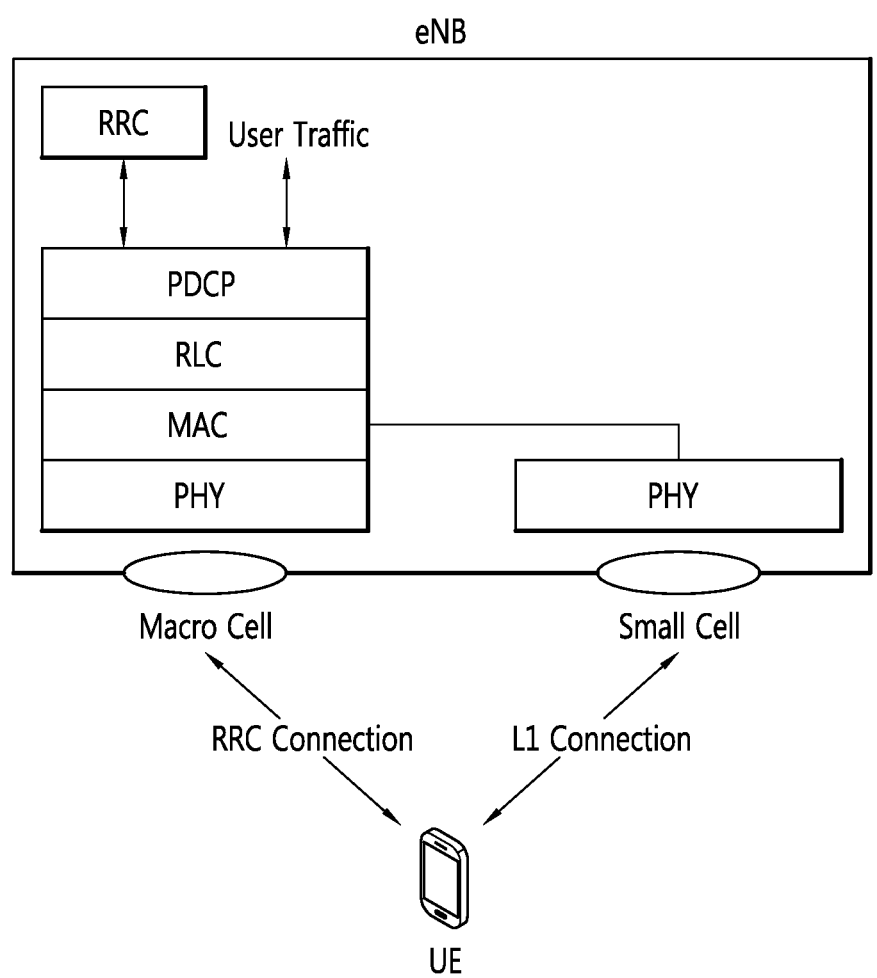
FIG. 7 shows an intra-eNB CA model for small cell enhancement.

FIG. 7 shows an intra-eNB CA model for small cell enhancement.

Referring to FIG. 7, the intra-eNB CA model has the following characteristics:
  The macro cell and the small cell belong to the same eNB.
  One RRC connection is established with the macro cell.
  All SRBs and all DRBs are established with PDCP and RLC at the macro cell.
  L1 connection only is established with the small cell.
  One MAC entity common to both the macro cell and the small cell The UE establishes an RRC connection with the macro cell. Then, UE establishes a L1 connection with the small cell.

The E-UTRAN supporting this model deploys the macro cell and the small cell in the same eNB. There is no split of control plane and user plane in the E-UTRAN. The E-UTRAN has only one MAC entity which is common to the macro cell and the small cell for the UE. The E-UTRAN establishes PDCP and RLC entities for all radio bearers of the UE at the macro cell.

The E-UTRAN supporting this model is very similar to the E-UTRAN supporting the existing carrier aggregation. The UE supporting CA may consider the macro cell as PCell and the small cell as SCell.

It is understood that both the E-UTRAN and UE already support this model for carrier aggregation from Rel-10/11. Thus, a main benefit of this model is to require only minor impacts on the E-UTRAN and UE for small cell enhancement. A major change of the E-UTRAN and UE might happen only at the physical layer for small cell enhancement.

However, this model does not support the case that the macro cell and the small cell belong to different eNBs. This seems to be a major drawback of this model, because small cell owners, e.g., operators, may deploy small cells only through the same eNBs supporting the macro cells.

2) Inter-eNB CA Model

Figure 8:
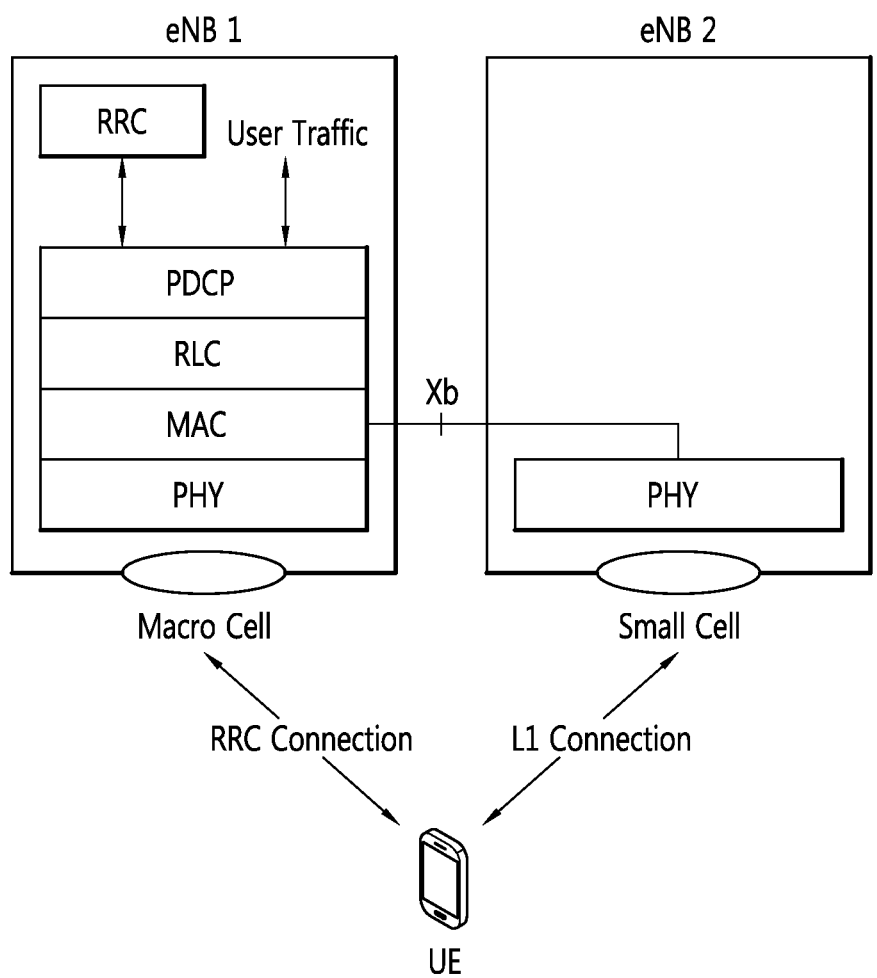
FIG. 8 and FIG. 9 show an inter-eNB CA model for small cell enhancement.
Figure 9:
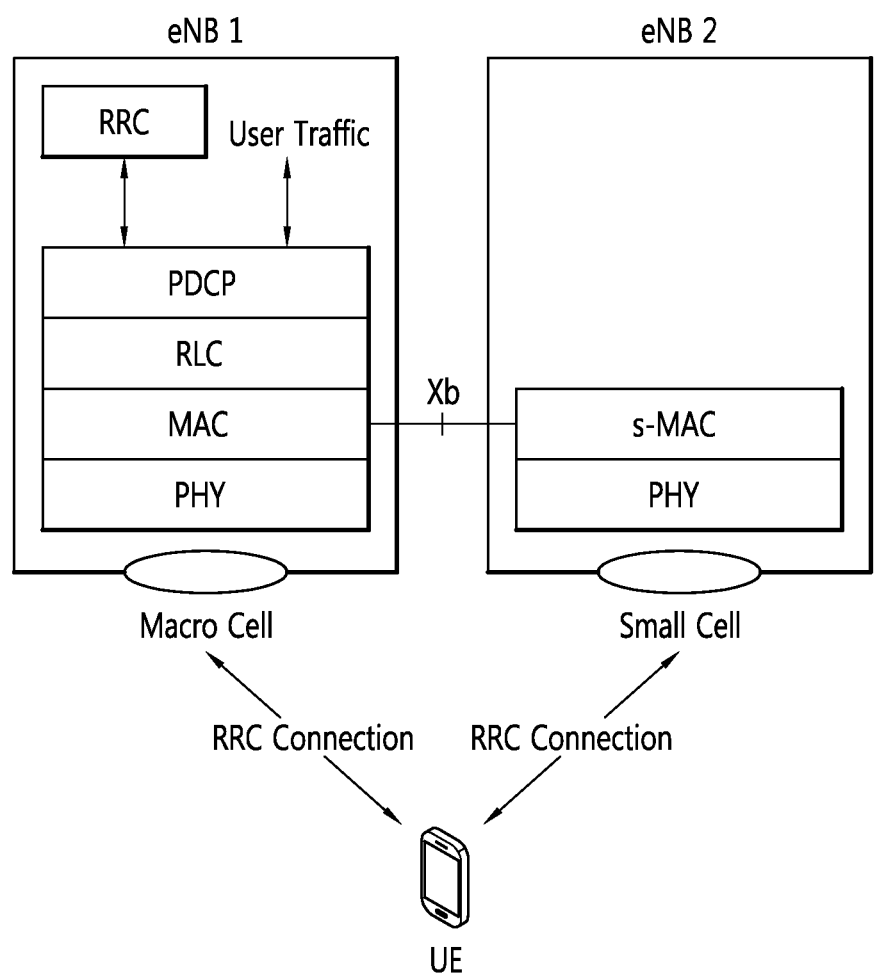

FIG. 8 and FIG. 9 show an inter-eNB CA model for small cell enhancement.

Referring to FIG. 8 and FIG. 9, the inter-eNB CA model has the following characteristics:
  The macro cell and the small cell belong to different eNBs with an inter-eNB interface Xb.
  One RRC connection is established with the macro cell.
  All SRBs and all DRBs established with PDCP and RLC at the macro cell.
  L1 connection only is established with the small cell.
  There is one MAC entity at the macro cell (and, possibly additional MAC entity at the small cell).

The UE establishes an RRC connection with the macro cell. Then, the UE establishes a L1 connection with the small cell.

The E-UTRAN supporting this model deploys the macro cell and the small cell in different eNBs. There is one network interface between different eNBs, i.e., Xb interface. The Xb interface supports exchange of necessary information between eNB controlling the macro cell and eNB controlling the small cell, in order to support a radio interface with the UE.

The eNB controlling the small cell has no interface with the S-GW for the UE. The eNB controlling the small cell sends all user traffic received from the UE to the eNB controlling the macro cell. Then, the eNB controlling the macro cell sends the received user traffic to the S-GW for the UE.

There is no split of control plane and user plane in the E-UTRAN. But, the E-UTRAN has one physical layer at the macro cell and another physical layer at the small cell for the UE.

When it comes to the MAC layer, the E-UTRAN may have a single MAC only at the macro cell, as described in FIG. 8. It may be called a first inter-eNB CA model. Alternatively, the E-UTRAN may have one MAC entity at the macro cell and another MAC entity at the small cell for the UE, as described in FIG. 9. It may be called a second inter-eNB CA model.

Referring to FIG. 8, the single MAC entity at the macro cell provides all MAC functionalities such as HARQ, scheduling and random access. Hence, the eNB controlling the small cell sends all MAC PDUs received from the UE to the eNB controlling the macro cell. And, the eNB controlling the macro cell may send some MAC PDUs to the eNB controlling the small cell, in order to transmit the MAC PDUs from the small cell to the UE, depending on scheduling.

Referring to FIG. 9, while the MAC at the macro cell provides entire MAC functionalities, the MAC at the small cell, called secondary MAC, provides limited or entire MAC functionalities for the UE. For instance, HARQ transmission/re-transmissions may be done over the L1 connection directly between the s-MAC of the small cell and the UE, in order for the network to avoid inter-eNB delay over Xb.

Note that RRC is located only at the macro cell. The RRC at the macro cell performs connection control, mobility and radio bearer management for both the macro cell and the small cell.

The inter-eNB CA model would require relatively minor impacts on the UE supporting CA, if Rel-10/11 CA is utilized for small cell enhancement. However, there would be some impact on the E-UTRAN side, mainly due to inter-eNB communication.

In the first inter-eNB CA model, inter-eNB delay for MAC operation such as HARQ operation may be considered. In addition, it seems to be questionable whether or not the first inter-eNB CA model supports all categories of backhaul. When small cell owners deploy small cells based on the first inter-eNB CA model, they may have limitation due to backhaul latency.

On the other hand, in the second inter-eNB CA model, i.e., MAC split between different eNBs, the s-MAC at the small cell may be installed and then s-MAC is allowed to independently operate some MAC functionalities such as HARQ, scheduling and random access. Thus, the second inter-eNB CA model may alleviate some impacts that are expected to occur due to inter-eNB latency.

However, the E-UTRAN supporting the second inter-eNB CA model may have some inter-eNB communications over the Xb interface, due to independent PHY/MAC operations between different eNBs for the same UE. Also, the E-UTRAN supporting the first inter-eNB CA model may possibly have inter-eNB communications due to independent PHY operations between different eNBs for the same UE. Considering dynamicity in PHY/MAC operations, frequent exchange of PHY/MAC information between different eNBs, such as scheduling information and HARQ information, may be expected. Increased overhead that might occur due to frequency information exchange between eNBs seems to be a drawback of the inter-eNB CA model.

In addition, small cell enhancement should support significantly increased user throughput for both downlink and uplink. Hence, it is expected that eNBs controlling the small cell may need to process more amounts of user packets than legacy eNBs that might control the macro cell. In this sense, if the eNB controlling the macro cell receives user packets from the eNB controlling the small cell, the eNB controlling the macro cell should process more amounts of user packets than before.

3) Inter-eNB C/U Split Model

Figure 10:
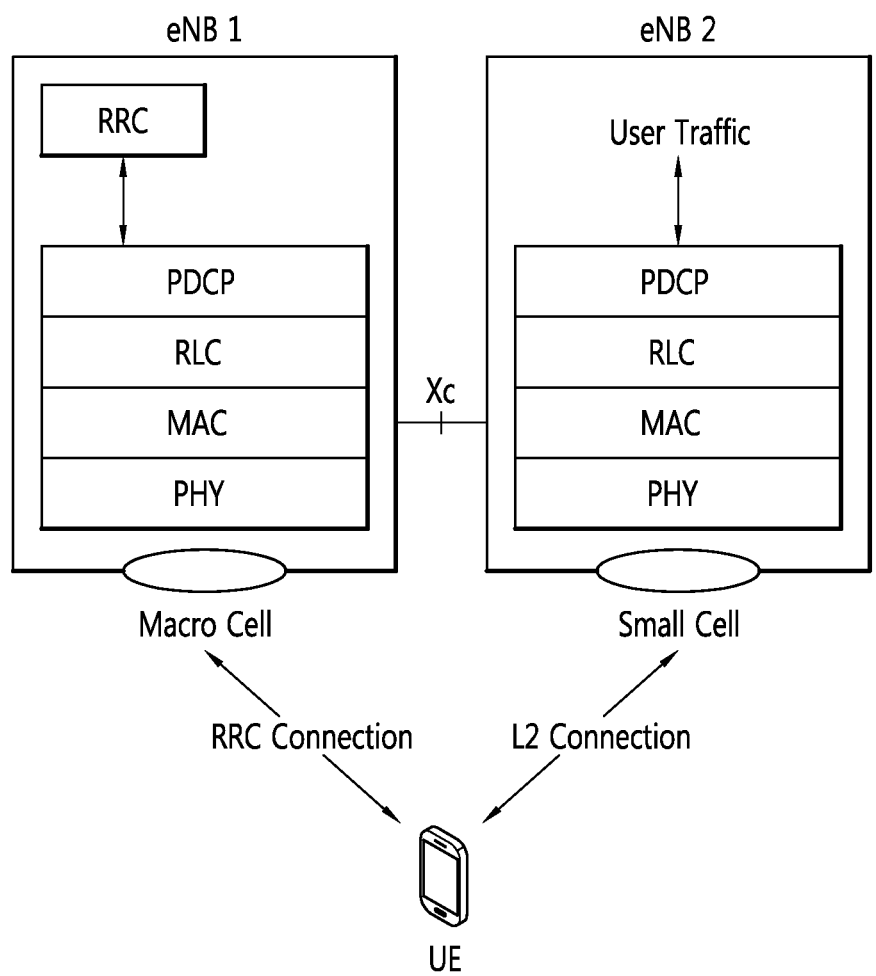
FIG. 10 shows an inter-eNB C/U split model for small cell enhancement.

FIG. 10 shows an inter-eNB C/U split model for small cell enhancement.

Referring to FIG. 10, the inter-eNB C/U split model has the following characteristics:

The macro cell and the small cell belong to different eNBs with an inter-eNB interface Xc.

One RRC connection is established with the macro cell.

SRBs (and possibly a few DRBs) are established with PDCP and RLC at the macro cell.

All DRBs (or most of DRBs) are established with PDCP and RLC at the small cell.

L2 connection is established with the small cell only for user plane of the radio interface.

There is one MAC entity at the macro cell and another MAC entity at the small cell.

The UE establishes an RRC connection with the macro cell. Then, UE establishes a L2 connection with the small cell.

The E-UTRAN supporting this model deploys the macro cell and the small cell in different eNBs. There is one network interface between different eNBs, i.e., Xc interface. The Xc interface supports exchange of necessary information between the eNB controlling the macro cell and the eNB controlling the small cell, in order to support a radio interface with the UE.

There is split of control plane and user plane in the E-UTRAN. The eNB controlling the small cell has an interface with the S-GW for the UE. The eNB controlling the small cell can send all user traffic received from the UE directly to the S-GW for the UE.

The E-UTRAN has one L1/L2 at the macro cell and another L1/L2 at the small cell for the UE. While the MAC at the macro cell provides entire MAC functionalities for the macro cell, the MAC at the small cell provides entire MAC functionalities for the small cell. The MAC of the small cell is allowed to independently operate MAC functionalities for the small cell.

RRC is located only at the macro cell. The RRC at the macro cell performs connection control, mobility and radio bearer management for both the macro cell and the small cell. Namely, the macro cell controls management of all DRBs and radio resources, even though the DRBs and radio resources are established/configured at the small cell.

One benefit of this model is that the eNB controlling the macro cell needs not to process an amount of user traffic that is expected to significantly increase for both downlink and uplink due to small cell enhancement, compared to the intra-eNB CA model and inter-eNB CA model. It is because the eNB controlling the small cell have a direct interface with the S-GW for sending or receiving user traffic.

Regarding this model, we could utilize Rel-10/11 CA to reduce impacts on UE for small cell enhancement. On the other hand, there would be significant impact on the E-UTRAN side, mainly due to the split of control plane and user plane of the radio interface which requires change of E-UTRAN architecture.

Compared to the previous models, PDCP also needs to be established at the small cell. This would raise an issue on AS security, because of security function in PDCP. For instance, it would be questionable whether or not different PDCP entities in different eNBs need to apply encryption of user traffic based on different security keys. Due to this issue, this model could increase complexity in the E-UTRAN and UE.

The E-UTRAN supporting this model may have inter-eNB communications over the Xc interface for the same UE. However, compared to the inter-eNB CA model, exchanging dynamic information between different eNBs may be avoided, because MAC entities in different eNBs could independently perform L1/L2 operations.

Also, inter-eNB communications related to RRC function is expected because RRC is located only at the macro cell. For instance, the eNB controlling macro cell needs to communicate with the eNB controlling the small cell, in order to reconfigure DRBs or radio resources at the small cell. However, it is expected that RRC-related information would not be frequently exchanged between eNBs.

4) Inter-eNB RRC Split Model

Figure 11:
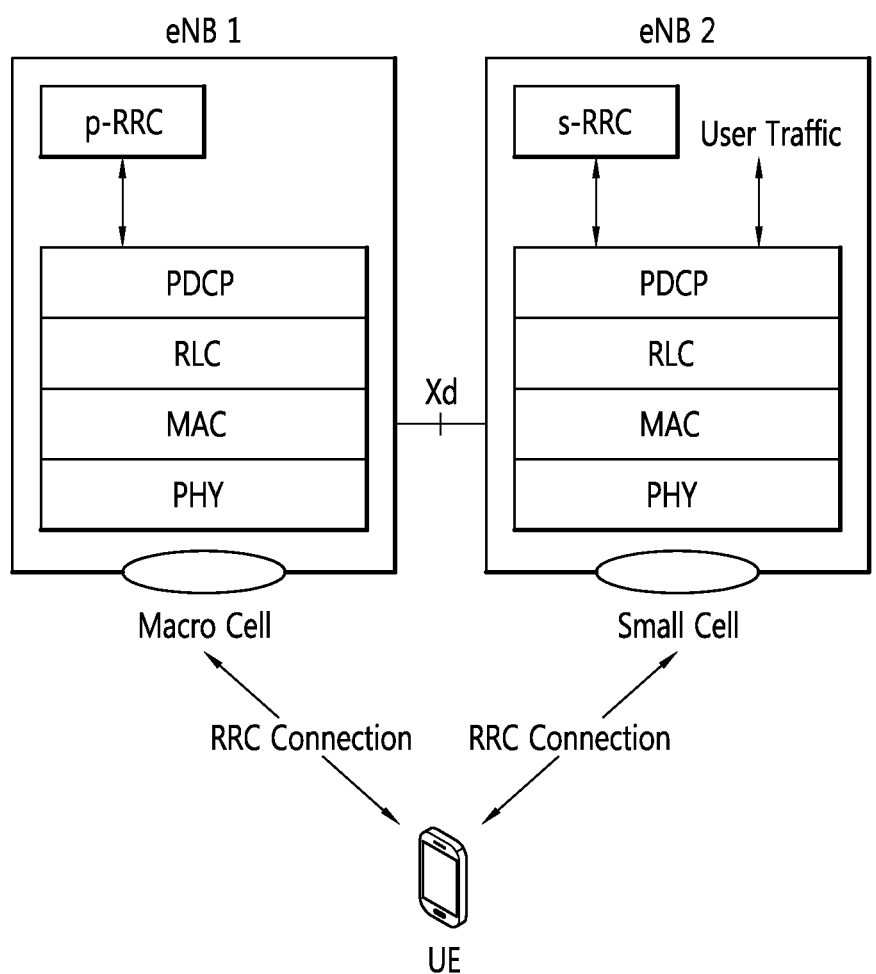
FIG. 11 shows an inter-eNB RRC split model for small cell enhancement.

FIG. 11 shows an inter-eNB RRC split model for small cell enhancement.

Referring to FIG. 11, the inter-eNB RRC split model has the following characteristics:

The macro cell and the small cell belong to different eNBs with an inter-eNB interface Xc.

One RRC connection is established with the macro cell and another RRC connection with the small cell.

SRBs (and possibly a few DRBs) are established with PDCP and RLC at the macro cell.

SRBs and all DRBs (or most of DRBs) are established with PDCP and RLC at the small cell.

The RRC connection established with the small cell is used for management of user plane.

There is one MAC entity at the macro cell and another MAC entity at the small cell.

The UE establishes an RRC connection with the macro cell. Then, UE establishes a RRC connection with the small cell.

The E-UTRAN supporting this model deploys the macro cell and the small cell in different eNBs. There is one network interface between different eNBs, i.e., Xd interface. The Xd interface supports exchange of necessary information between the eNB controlling the macro cell and the eNB controlling the small cell, in order to support a radio interface with the UE.

There is split of control plane and user plane in the E-UTRAN. The eNB controlling the small cell has an interface with the S-GW for the UE. The eNB controlling the small cell can send all user traffic received from the UE directly to the S-GW for the UE.

In addition, there is split of RRC functions between the macro cell and the small cell in different eNBs. The RRC of the macro cell, called primary RRC, maintains RRC connections and perform mobility control, while the RRC of the small cell, called secondary RRC, controls radio resources and DRBs established for the small cell. The RRC of the macro cell also controls radio resources and RBs established for the macro cell.

Similar to the inter-eNB C/U split model, the E-UTRAN has one L1/L2 at the macro cell and another L1/L2 at the small cell for the UE. The MAC of the small cell is allowed to independently operate MAC functionalities for the small cell.

In this model, the eNB controlling the small cell controls radio resources and DRBs established at the small cell by itself, because the small cell can send an RRC message directly to the UE. Hence, one benefit of this model is that the E-UTRAN supporting this model could avoid or reduce exchange of information related to radio resources and DRBs of the small cell between different eNBs.

Additionally, similar to inter-eNB C/U split model, as another the benefit, the eNB controlling the macro cell needs not to process an amount of user traffic, because the eNB controlling the small cell have a direct interface with the S-GW for sending or receiving user traffic.

However, there would be significant impact on both the E-UTRAN side and the UE side, due to the split of control plane and user plane of the radio interface and the split of RRC function. The UE should maintain dual RRC connections and differentiate an RRC message communicated with p-RRC, and an RRC message communicated with s-RRC.

Similar to the inter-eNB C/U split model, PDCP also needs to be established at the small cell. Thus, this model could increase complexity in the E-UTRAN and UE due to AS security handling.

The table 1 shows pros and cons of each architecture model for small cell enhancement.

TABLE 1

|  | Intra-eNB CA | Inter-eNB CA | Inter-eNB C/U Split | Inter-eNB RRC Split |
|---|---|---|---|---|
| Pros | Full utilization of CA operation Only minor impact on UE and E-UTRAN in RAN2/3 | Utilization of CA operation More or less small impact on UE in RAN2 | Less significant impact on UE in RAN2 User traffic load distribution with C/U split Less inter-eNB latency problem due to independent L2 Lightly frequent inter-eNB communications No user traffic flows between eNBs due to C/U split | User traffic load distribution with C/U split Less inter-eNB latency problem due to independent L2 Infrequent inter-eNB communications No user traffic flows between eNBs due to C/U split |
| Cons | No support of macro/small cells in different eNBs | Some impact on E-UTRAN Process of increased amounts of user traffic at the macro cell side Inter-eNB latency problem Heavily frequent inter-eNB communications Heavy user traffic flows between eNBs | Significant impact on E-UTRAN/EPC due to C/U split Support of security for the small cell | Some impact on UE in RAN2 due to dual RRC connections Significant impact on E-UTRAN/EPC due to C/U split and RRC split Support of security for the small cell |

Figure 12:
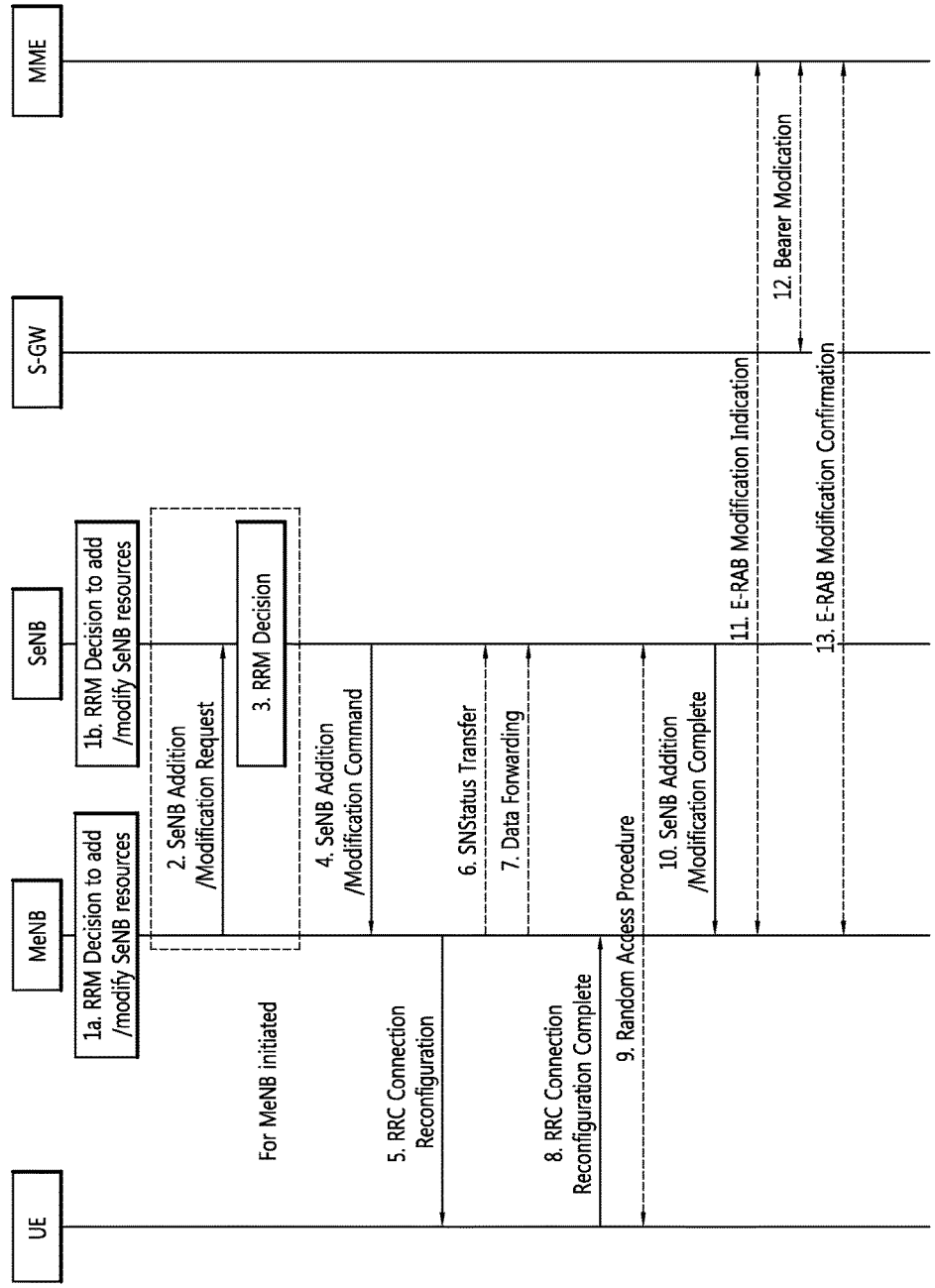
FIG. 12 shows an overall signaling scheme for addition and modification of SeNB resources for dual connectivity operation.

FIG. 12 shows an overall signaling scheme for addition and modification of SeNB resources for dual connectivity operation.

1a. The MeNB decides to request the SeNB to add or modify radio resources for a specific E-UTRAN radio access bearer (E-RAB).

1b. The SeNB decides to modify radio resources for a specific E-RAB. This step may include additional coordination between the SeNB and MeNB to make sure that e.g., the capabilities of the UE are not exceeded.

2. The MeNB requests the SeNB to allocate/modify radio resources. Depending on the actual scenario, it might contain E-RAB characteristics (E-RAB parameters, transport network layer (TNL) address information corresponding to the UP option), UE capabilities and the current radio resource configuration of the UE, etc.

3. If the RRM entity in the SeNB is able to admit the resource request, it configures respective radio resources and, dependent on the UP option, respective transport network resources. The SeNB may also allocate dedicated RACH preamble for the UE so that synchronization of the SeNB radio resource configuration can be performed.

4. The SeNB provides the new radio resource configuration to the MeNB.

5. The MeNB endorses the new configuration and triggers the UE to apply it. The UE starts to apply the new configuration.

6/7. The MeNB may, dependent on respective E-RAB characteristics, take actions to minimize service interruption due to activation of dual connectivity (data forwarding, sequence number (SN) status report).

8. The UE completes the reconfiguration procedure.

9. The UE performs synchronization towards the cell of the SeNB if needed. The order of the RRC connection reconfiguration complete message (steps 8) and the synchronization procedure (step 9) is not determined yet, i.e., for further study (FFS). In addition, transmission of user plane data from the SeNB to the UE may take place after step 8 or 9 depending on the synchronization procedure.

10. The SeNB reports to the MeNB the detection of synchronization with the UE, confirming that the new configuration is in use. Receipt of the message in step 10 by the MeNB successfully completes the overall SeNB Addition/Modification procedure on X2. Depending on the decision on the order of RRC reconfiguration and synchronization or on the support of synchronization, step 10 might be either necessary as described above or in the reverse direction (from the MeNB to SeNB).

11-13. If applicable, the update of the UP path towards the EPC is performed.

As described above, when SeNB resources, e.g., SCell, addition or modification is performed, the order of the RRC connection reconfiguration complete message and the synchronization procedure is not determined yet. It may be required to define the order of the RRC connection reconfiguration complete message and the synchronization procedure clearly.

Figure 13:
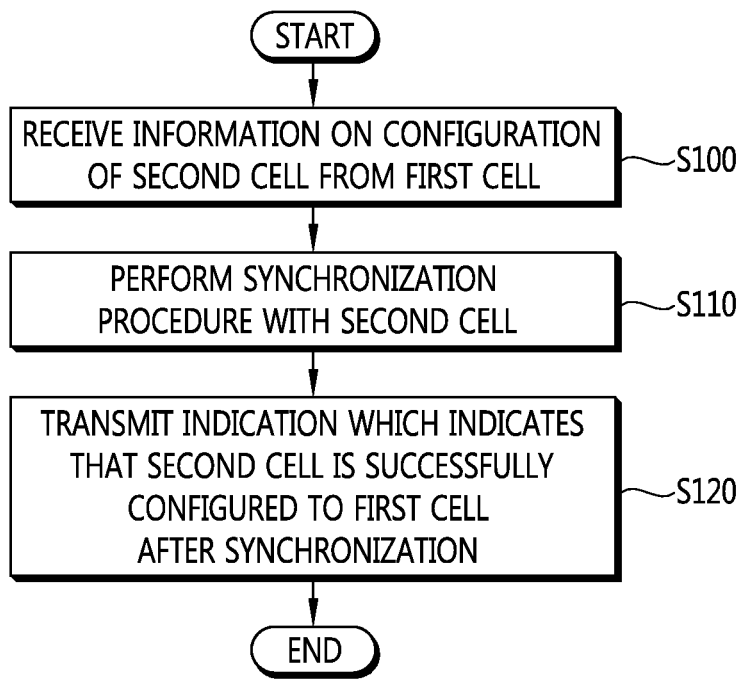
FIG. 13 shows an example of a method for transmitting an indication according to an embodiment of the present invention.

FIG. 13 shows an example of a method for transmitting an indication according to an embodiment of the present invention.

In step S100, the UE receives information on a configuration of a second cell from a first cell. The first cell and the second cell may be controlled by different eNBs respectively. More specifically, the first cell may be a PCell of the MeNB, and the second cell may be a SCell of the SeNB. That is, the UE supports dual connectivity with the MeNB and the SeNB. Or, The first cell may be a macro cell controlled by the MeNB, the second cell may be a small cell controlled by the SeNB. The information on the configuration may be received via an RRC connection reconfiguration message.

In step S110, the UE performs a synchronization procedure with the second cell. The synchronization procedure may include a random access procedure.

In step S120, after the synchronization procedure is successfully performed, the UE transmits an indication, which indicates that the second cell is successfully configured, to the first cell. The successful configuration of the second cell may include an addition of the second cell. The indication may be transmitted via an RRC connection reconfiguration complete message.

According to the embodiment of the present invention described in FIG. 13, it is clear that the RRC connection reconfiguration complete message is transmitted after the synchronization procedure. By transmitting the RRC connection reconfiguration complete message after the synchronization procedure is successfully performed, the UE may confirm that the second is successfully configured.

Figure 14:
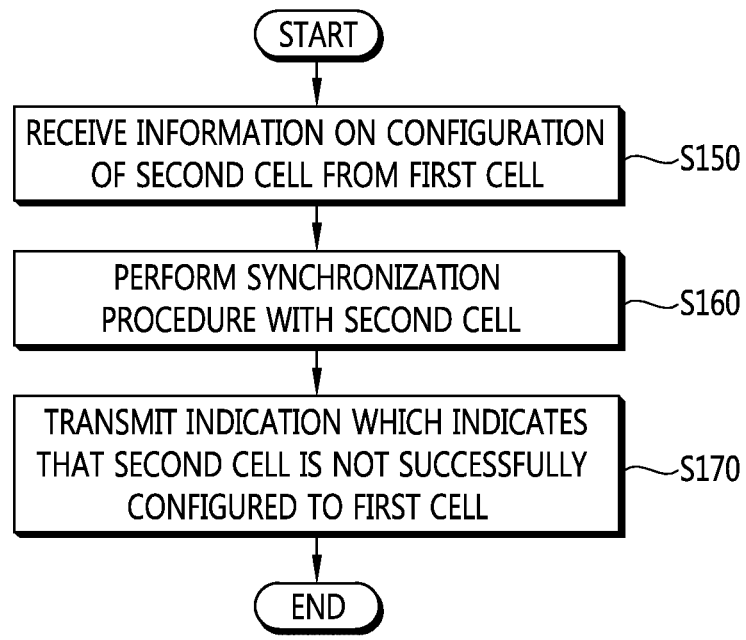
FIG. 14 shows an example of a method for transmitting an indication according to another embodiment of the present invention.

FIG. 14 shows an example of a method for transmitting an indication according to another embodiment of the present invention.

In step S150, the UE receives information on a configuration of a second cell from a first cell. The first cell and the second cell may be controlled by different eNBs respectively. More specifically, the first cell may be a PCell of the MeNB, and the second cell may be a SCell of the SeNB. That is, the UE supports dual connectivity with the MeNB and the SeNB. Or, The first cell may be a macro cell controlled by the MeNB, the second cell may be a small cell controlled by the SeNB. The information on the configuration may be received via an RRC connection reconfiguration message.

In step S160, the UE performs a synchronization procedure with the second cell. The synchronization procedure may include a random access procedure.

In step S170, if the synchronization procedure is not successfully performed, the UE transmits an indication, which indicates that the configuration of the second cell is failed, to the first cell. The indication may be transmitted via an RRC connection re-establishment request message.

According to the embodiment of the present invention described in FIG. 14, it is clear that the RRC connection re-establishment request message is transmitted after the synchronization procedure. By transmitting the RRC connection re-establishment request message after the synchronization procedure is not successfully performed, the UE may confirm that the configuration of the second is failed.

Figure 15:
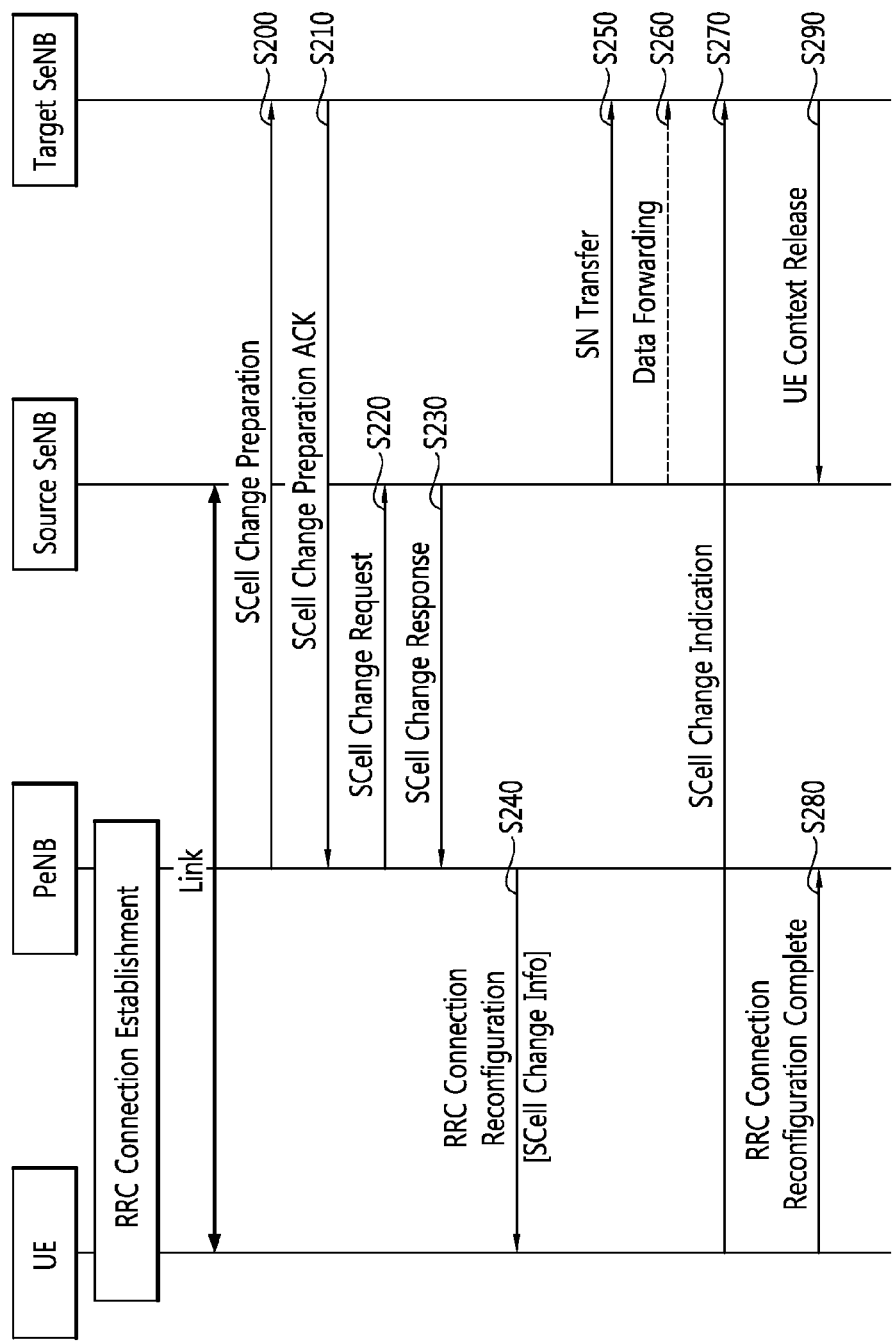
FIG. 15 shows an example of SCell change controlled by a PCell according to an embodiment of the present invention.

FIG. 15 shows an example of SCell change controlled by a PCell according to an embodiment of the present invention. The UE establishes an RRC connection with a PCell of the MeNB, which controls the macro cell, for mobility of the UE and a radio link with a SCell of the SeNB, which controls one or more small cells, for user traffic over data radio bearers. That is, this embodiment is based on the inter-eNB C/U split model described in FIG. 10 above.

Upon decision of SCell change from a source cell of the source SeNB to a target cell of the target SeNB on a frequency, in step S200, the MeNB prepares SCell change with the target SeNB by transmitting a SCell change preparation message to the target SeNB. The SCell change preparation message may include UE context information and one or more 'E-RABs to be setup list'.

Upon receiving the SCell change preparation message, the target SeNB performs admission control. The target SeNB may accept the preparation as a result of the admission control, and then, in step S210, transmit a SCell change preparation acknowledge (ACK) message to the MeNB. The SCell change preparation ACK message may contain a list of E-RABs admitted by the target SeNB among the list of E-RABs to be setup, and a list of E-RABs not admitted by the target SeNB.

Upon decision of SCell change from a source cell of the source SeNB to a target cell of the target SeNB on a frequency, in step S220, the MeNB requests the source SeNB to perform SCell change by transmitting a SCell change request message to the source SeNB. The SCell change request message may include information about the target cell of the target SeNB, such as eNB identity and cell identity.

Upon receiving the SCell change request message, if the source SeNB accepts this SCell change, in step S230, the source SeNB transmits a SCell change response message to the MeNB with acceptance. If the source SeNB does not accept this SCell change, the source SeNB transmits the SCell change response to the MeNB with rejection.

If the source SeNB accepts this SCell change, in step S240, the MeNB transmits an RRC connection reconfiguration message to the UE. The RRC connection reconfiguration message may include SCell change information, such as the cell identity and the carrier frequency of the target SCell. The RRC connection reconfiguration message may also include radio resource configuration, security parameters and UE identity that the UE will use for communication with the target SCell. In addition, the RRC connection reconfiguration message may include random access information such as a dedicated preamble used at the target SCell.

If the source SeNB accepts this SCell change, in step S250, the source SeNB transmits a SN transfer message to the target SeNB, to transfer the uplink/downlink PDCP SN and hyper frame number (HFN) status for data radio bearers relocated from the source SeNB to the target SeNB. The SN status message may include information on E-RABs subject to status transfer for RLC AM.

In step S260, the source SeNB may forward data packets to the target SeNB, in order to avoid data loss during SCell change.

Upon receiving the RRC connection reconfiguration message including the SCell change information, in step S270, the UE synchronizes to the downlink of the target SCell of the target SeNB. Then, the UE performs random access at the target SCell and transmits a SCell change indication to the target SeNB as a MAC control element. The SCell change indication may include the UE identity.

If the UE successfully accesses to the target SCell, i.e., the UE successfully transmits the SCell change indication to the target SeNB, in step S280, the UE transmits an RRC connection reconfiguration complete message to the MeNB.

If the UE does not successfully access to the target SCell, the UE performs RRC connection re-establishment procedure. During the RRC connection re-establishment procedure, the UE selects a cell and then transmits an RRC connection re-establishment request message including the PCell identity, the source SCell identity and the target SCell identity. Also, the RRC connection re-establishment request message may indicate 'SCell change failure' to the selected cell. The RRC Connection Re-establishment procedure will be successful only if the selected cell is one of the prepared cells including the PCell, source SCell, and target SCell.

After SCell change, i.e., upon receiving the SCell change indication, in step S290, the target SeNB transmits a UE context release message to the source SeNB. Then, the source SeNB releases the UE context related to the UE.

Figure 16:
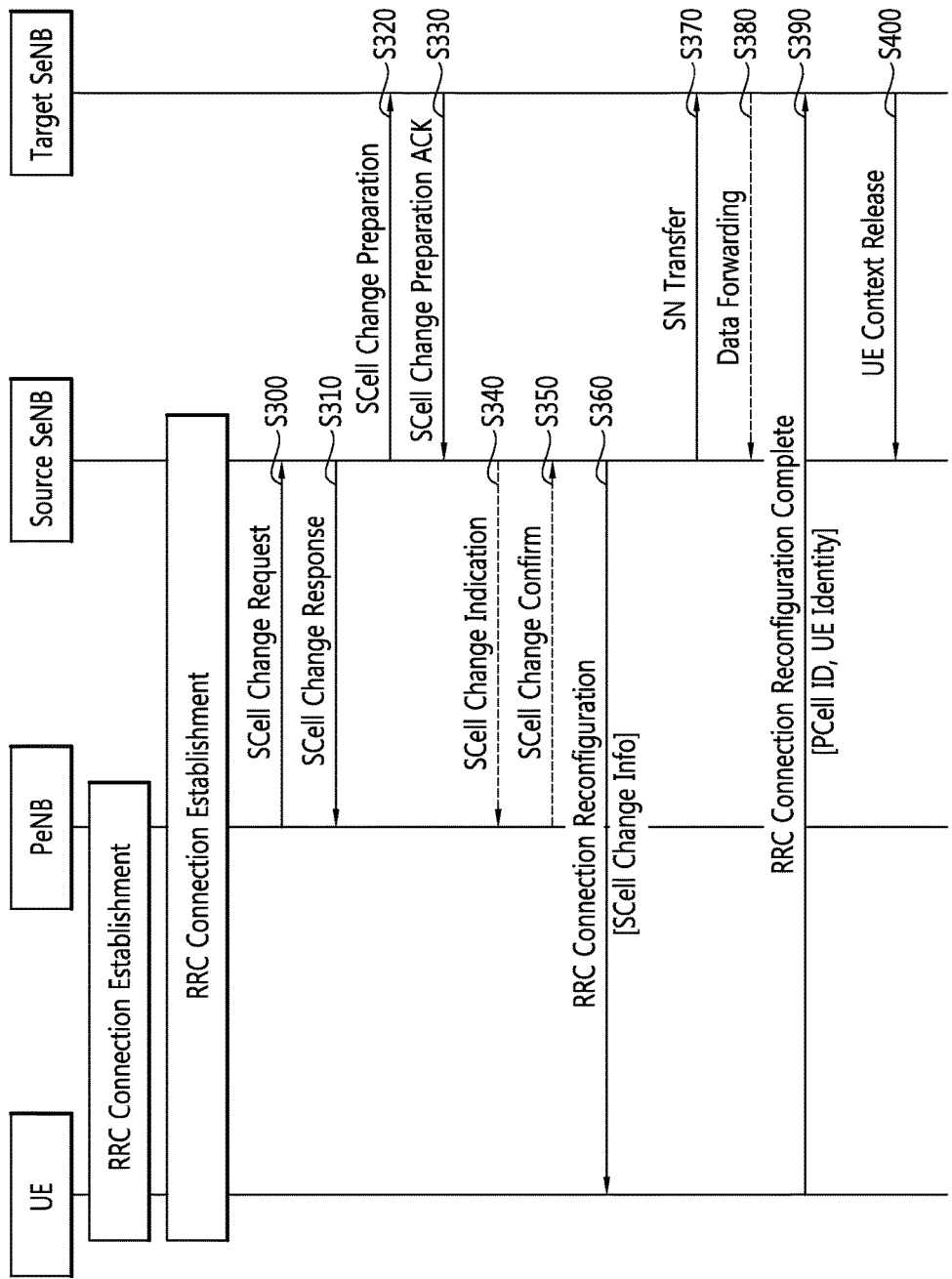
FIG. 16 shows an example of SCell change controlled by a source SCell according to an embodiment of the present invention.

FIG. 16 shows an example of SCell change controlled by a source SCell according to an embodiment of the present invention. The UE establishes an RRC connection with a PCell of the MeNB, which controls the macro cell, for mobility of the UE and another RRC connection with a SCell of the SeNB, which controls one or more small cells, for user traffic over data radio bearers. That is, this embodiment is based on the inter-eNB RRC split model described in FIG. 11 above.

Upon decision of SCell change from a source cell of the source SeNB to a target cell of the target SeNB on a frequency, in step S300, the MeNB may request the source SeNB to perform SCell change by transmitting a SCell change request message to the source SeNB. The SCell change request message may include information about the target cell of the target SeNB, such as eNB identity and cell identity.

Upon receiving the SCell change request message, if the source SeNB accepts this SCell change, in step S310, the source SeNB transmits a SCell change response message to the MeNB with acceptance. If the source SeNB does not accept this SCell change, the source SeNB transmits a SCell change response message to the MeNB with rejection.

If the source SeNB accepts this SCell change, in step S320, the source SeNB prepares SCell change with the target SeNB by transmitting a SCell change preparation message to the target SeNB. The SCell change preparation message may include UE context information and one or more 'E-RABs to be setup list'.

Upon receiving the SCell change preparation message, the target SeNB performs admission control. The target SeNB may accept the preparation as a result of the admission control, and then, in step S330, transmit a SCell change preparation ACK message to the source SeNB. The SCell change preparation ACK message may contain a list of E-RABs admitted by the target SeNB among the list of E-RABs to be setup, and a list of E-RABs not admitted by the target SeNB.

Upon preparing SCell change, in step S340, the source SeNB indicates to the MeNB that the SCell change is prepared, by transmitting a SCell change indication. The SCell change indication may include information about the target cell of the target SeNB, such as eNB identity and cell identity.

Upon receiving the SCell change indication, if the MeNB accepts this SCell change, in step S350, the MeNB transmits a SCell change confirm to the source SeNB with acceptance. If the MeNB does not accept this SCell change, the MeNB transmits the SCell change confirm to the source SeNB with rejection.

If the MeNB accepts this SCell change, in step S360, the source SeNB (or the MeNB) transmits an RRC connection reconfiguration message to the UE. The RRC connection reconfiguration message may include SCell change information such as the cell identity and the carrier frequency of the target SCell. The RRC connection reconfiguration message may also include radio resource configuration, security parameters and UE identity that the UE will use for communication with the target SCell. In addition, the RRC connection reconfiguration message may include random access information such as a dedicated preamble used at the target SCell.

If the source SeNB accepts this SCell change, in step S370, the source SeNB transmits a SN transfer message to the target SeNB, to transfer the uplink/downlink PDCP SN and HFN status for data radio bearers relocated from the source SeNB to the target SeNB. The SN transfer message includes information on E-RABs subject to status transfer for RLC AM.

In step S380, the source SeNB may forward data packets to the target SeNB, in order to avoid data loss during SCell change.

Upon receiving the RRC connection reconfiguration message including SCell change information, in step S390, the UE synchronizes to the downlink of the target SCell of the target SeNB. Then, the UE performs random access at the target SCell and transmits an RRC connection reconfiguration complete message to the target SeNB. The UE derives security keys based on the security parameters received from the RRC connection reconfiguration message, and then applies ciphering and integrity protection to the RRC connection reconfiguration complete message that includes the UE identity.

If the UE does not successfully access to the target SCell, the UE performs an RRC connection re-establishment procedure. During the RRC connection re-establishment procedure, the UE selects a cell and then transmits an RRC connection re-establishment request message including the PCell identity, the source SCell identity and the target SCell identity. Also, the RRC connection re-establishment request message may indicate 'SCell change failure' to the selected cell. The RRC connection re-establishment will be successful only if the selected cell is one of the prepared cells including the PCell, source SCell, and target SCell.

After SCell change, i.e., upon receiving the SCell change indication, in step S400, the target SeNB transmits a UE context release message to the source SeNB. Then, the source SeNB releases the UE context related to the UE.

According to embodiments of the present invention described in FIG. 15 and FIG. 16, if the RRCConnectionReconfiguration message includes the SCell ChangeInfo and the UE is able to comply with the configuration included in this message, the UE shall:

1> stop timer T310, if running;
1> start timer T304 with the timer value set to t304, as included in the SCell ChangeInfo;
1> if the carrierFreq is included:
2> consider the target SCell to be one on the frequency indicated by the carrierFreq with a physical cell identity indicated by the targetPhysCellId;
1> else:
2> consider the target SCell to be one on the frequency of the source SCell with a physical cell identity indicated by the targetPhysCellId;
1> start synchronizing to the DL of the target SCell;
1> reset MAC for all data radio bearers corresponding to the source/target SCell;
(Or, reset MAC for the data radio bearers that are indicated in the RRCConnectionReconfiguration message including the SCell ChangeInfo, if indicated);
1> Re-establish PDCP for all DRBs that are established for the source/target SCell;
(Or, re-establish PDCP for the established DRBs that are indicated in the RRCConnectionReconfiguration message including the SCell ChangeInfo, if indicated);
1> re-establish RLC for all DRBs that are established for the source/target SCell;
(Or, re-establish RLC for the established DRBs that are indicated in the RRCConnectionReconfiguration message including the SCell ChangeInfo, if indicated);
1> configure lower layers to consider the target SCell(s), if configured, to be in deactivated state;
1> apply the value of the newUE-Identity used only at the SCell(s) as the C-RNTI for the target SCell(s);
1> if the RRCConnectionReconfiguration message includes the fullConfig:
2> perform the radio configuration procedure;
1> configure lower layers in accordance with the received radioResourceConfigCommon only for the target SCell and the SCells indicated in the RRCConnectionReconfiguration;
1> configure lower layers in accordance with any additional fields, not covered in the previous, if included in the received SCell ChangeInfo;
1> if the RRCConnectionReconfiguration message includes the radioResourceConfigDedicated for the SCells indicated in the RRCConnectionReconfiguration:
2> perform the radio resource configuration procedure only for the target SCell and the SCells indicated in the RRCConnectionReconfiguration;
1> if the keyChangeIndicator received in the securityConfigHO for this SCell change is set to TRUE:
2> update the $K_{eNB}$ key based on the fresh $K_{ASME}$ key taken into use with the previous successful NAS SMC procedure for the target SCell;
1> else:
2> update the $K_{eNB}$ key based on the current $K_{eNB}$ or the NH, using the nextHopChainingCount value indicated in the securityConfigHO for the target SCell;
1> store the nextHopChainingCount value for the target SCell;
1> if the securityAlgorithmConfig is included in the securityConfigHO for this SCell change:
2> derive the $K_{RRCint}$ key associated with the integrityProtAlgorithm for the target SCell;
2> if connected as an RN:
3> derive the $K_{UPint}$ key associated with the integrityProtAlgorithm for the target SCell;
2> derive the $K_{RRCenc}$ key and the $K_{UPenc}$ key associated with the cipheringAlgorithm for the target SCell;
1> else:
2> derive the $K_{RRCint}$ key associated with the current integrity algorithm for the target SCell;
2> if connected as an RN:
3> derive the $K_{UPint}$ key associated with the current integrity algorithm for the target SCell;
2> derive the $K_{RRCenc}$ key and the $K_{UPenc}$ key associated with the current ciphering algorithm for the target SCell;
1> configure lower layers to apply the integrity protection algorithm and the $K_{RRCint}$ key, i.e. the integrity protection configuration shall be applied to all subsequent messages received and sent by the UE toward the target SCell, including the message used to indicate the successful completion of the procedure toward the target SCell;
1> configure lower layers to apply the ciphering algorithm, the $K_{RRCenc}$ key and the $K_{UPenc}$ key, i.e. the ciphering configuration shall be applied to all subsequent messages received and sent by the UE toward the target SCell, including the message used to indicate the successful completion of the procedure toward the target SCell;
1> if connected as an RN:
2> configure lower layers to apply the integrity protection algorithm and the $K_{UPint}$ key, for current or subsequently established DRBs that are configured for the target SCell to apply integrity protection, if any;
1> if the received RRCConnectionReconfiguration includes the sCellToReleaseList:
2> perform SCell release;
1> if the received RRCConnectionReconfiguration includes the sCellToAddModList:

2> perform SCell addition or modification;
1> (request MAC to send the SCellChangeIndication to the target SCell, and) submit the RRCConnectionReconfigurationComplete message to lower layers for transmission to either the target SCell or the PCell;
1> if MAC successfully completes the random access procedure:
2> stop timer T304;
2> apply the parts of the CQI reporting configuration, the scheduling request configuration and the sounding RS configuration that do not require the UE to know the SFN of the target SCell, if any;
2> apply the parts of the measurement and the radio resource configuration that require the UE to know the SFN of the target SCell (e.g. measurement gaps, periodic CQI reporting, scheduling request configuration, sounding RS configuration), if any, upon acquiring the SFN of the target SCell;
2> the procedure ends;

Alternatively, according to an embodiment of the present invention, the UE establishes an RRC connection with the first cell belonging to one eNB (for mobility of the UE), configures one or more layer 2 entities of one or more signaling radio bearers with the first cell, establishes a radio link with the second cell belonging to another eNB (for user traffic), configures one or more layer 2 entities of one or more data radio bearers with the second cell, receives a command of relocation from the second cell to the third cell for the data radio bearers, relocate the radio link from the second cell to the third cell, and re-establish/reset the layer 2 entities of all data radio bearers (while not re-establishing the layer 2 entities of all signaling radio bearers). The layer 2 entity may be PDCP, RLC or MAC entity. The step of re-establishing/resetting the layer 2 entities of all data radio bearers may comprise resetting MAC for all data radio bearers and re-establishing PDCP and RLC entities of all data radio bearers with the third cell. Further, the UE may receive a security parameter in the command and then updating the security keys only for all data radio bearers with the third cell.

Alternatively, according to another embodiment of the present invention, the UE establishes an RRC connection with the first cell belonging to one eNB (for mobility of the UE), configures one or more layer 2 entities of one or more signaling radio bearers with the first cell, establishes a radio link with the second cell belonging to another eNB (for user traffic), configures one or more layer 2 entities of one or more data radio bearers with the second cell, receives a command of relocation from the second cell to the third cell for the data radio bearers, receives an indication of one or more radio bearers, relocate the radio link from the second cell to the third cell, and re-establish/reset the layer 2 entities of the indicated radio bearers (while not re-establishing the layer 2 entities of other radio bearers than the indicated radio bearers). The layer 2 entity may be PDCP, RLC or MAC entity. The step of e-establishing/resetting the layer 2 entities of all data radio bearers may comprise resetting MAC for the indicated data radio bearers and re-establishing PDCP and RLC entities of the indicated data radio bearers with the third cell. Further, the UE may receive a security parameter in the command and then updating the security keys only for the indicated data radio bearers with the third cell.

Figure 17:
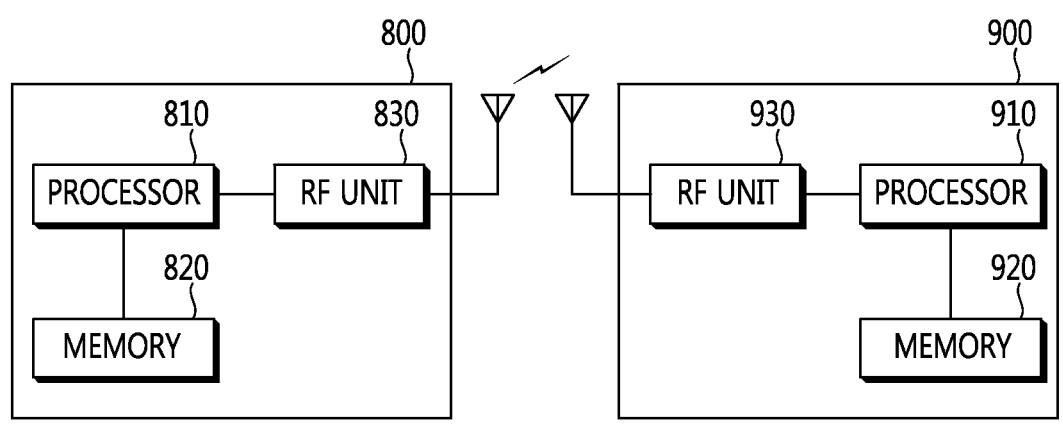
FIG. 17 shows a wireless communication system to implement an embodiment of the present invention.

FIG. 17 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting an indication in a wireless communication system, the method performed by a user equipment (UE) and comprising:
   receiving, from a primary serving cell (PCell) of a master eNodeB (MeNB), cell change information,
   wherein the cell change information is information for a target secondary serving cell (SCell) of a target secondary eNB (SeNB), and
   wherein the UE supports dual connectivity with the MeNB and the target SeNB;
   performing a cell change procedure from a source SCell of a source SeNB to the target SCell of the target SeNB based on the cell change information; and
   if the cell change procedure is successfully performed, transmitting, to the PCell, the indication while the UE maintains connection with the PCell,
   wherein the indication indicates that the cell change procedure from the source SCell to the target SCell was successfully performed.

2. The method of claim 1, wherein the PCell and the source SCell are controlled by different eNodeBs (eNBs) respectively, and
    wherein the PCell and the target SCell are controlled by different eNBs respectively.

3. The method of claim 1, wherein the PCell is a macro cell controlled by the MeNB; and
    wherein the target SCell is a small cell controlled by the target SeNB.

4. The method of claim 1, wherein the cell change procedure includes a random access procedure.

5. The method of claim 1, wherein the cell change information is received via a radio resource control (RRC) connection reconfiguration message.

6. The method of claim 1, wherein the indication is transmitted via an RRC connection reconfiguration complete message.

7. The method of claim 1, wherein the UE receives control signaling from the MeNB and receives data from the target SeNB in the dual connectivity, and
    wherein an interface between the MeNB and the target SeNB is non-ideal backhaul in the dual connectivity.

8. The method of claim 1, wherein the UE further supports dual connectivity with the MeNB and the source SeNB.

9. A method for transmitting, an indication in a wireless communication system, the method performed by a user equipment (UE) and comprising:
    receiving, from a primary serving cell (PCell) of a master eNB (MeNB), cell change information,
    wherein the cell change information is information for a target secondary serving cell (SCell) of a target secondary eNB (SeNB), and
    wherein the UE supports dual connectivity with the MeNB and the target SeNB;
    performing a cell change procedure from a source SCell of a source SeNB to the target SCell of the target SeNB based on the cell change information; and
    if the cell change procedure is not successfully performed, transmitting, to the PCell, the indication while the UE maintains connection with the PCell,
    wherein the indication indicates that the cell change procedure from the source SCell to the target SCell has failed.

10. The method of claim 9, wherein the indication is transmitted via an RRC connection re-establishment request message.

11. The method of claim 9, wherein the PCell and the target SCell are controlled by different eNodeBs (eNBs) respectively.

12. The method of claim 9, wherein the cell change procedure includes a random access procedure.

13. The method of claim 9, wherein the UE receives control signaling from the MeNB and receives data from the target SeNB in the dual connectivity, and
    wherein an interface between the MeNB and the target SeNB is non-ideal backhaul in the dual connectivity.

14. The method of claim 9, wherein the UE further supports dual connectivity with the MeNB and the source SeNB.

* * * * *